(12) United States Patent
Ootani

(10) Patent No.: US 7,633,332 B2
(45) Date of Patent: Dec. 15, 2009

(54) BOOSTING CIRCUIT AND BOOSTING METHOD

(75) Inventor: Keigo Ootani, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 0 days.

(21) Appl. No.: 12/216,487

(22) Filed: Jul. 7, 2008

(65) Prior Publication Data

US 2009/0009237 A1    Jan. 8, 2009

(30) Foreign Application Priority Data

Jul. 6, 2007    (JP)    .............................. 2007-178235

(51) Int. Cl.
  *G05F 1/10*    (2006.01)
(52) U.S. Cl. ...................................... 327/536
(58) Field of Classification Search ......... 327/534–537, 327/540–543
  See application file for complete search history.

(56) References Cited

U.S. PATENT DOCUMENTS 5,371,705 A * 12/1994 Nakayama et al. ..... 365/185.23
5,933,047 A *  8/1999 Zhu et al. ................... 327/534
7,477,048 B2 *  1/2009 Takeshi ...................... 323/285

FOREIGN PATENT DOCUMENTS

JP    2005-45934    2/2005

* cited by examiner

*Primary Examiner*—Lincoln Donovan
*Assistant Examiner*—Hai L Nguyen
(74) *Attorney, Agent, or Firm*—McGinn IP Law Group PLLC

(57) ABSTRACT

A boosting circuit includes a boosting capacitor to which an input voltage is applied; a smoothing capacitor to which a boosted voltage is applied; a discharging MOS transistor configured to connect said boosting capacitor and said smoothing capacitor in a discharging operation during a boosting operation period such that charge stored in said boosting capacitor is discharged to said smoothing capacitor; and a charging MOS transistor configured to apply the input voltage to said boosting capacitor in a charging operation during the boosting operation period to charge up said charging capacitor. A back gate of said charging MOS transistor and a back gate of said discharging MOS transistor are connected to a common node, and said common node is connected to different voltages in the charging operation and the discharging operation.

18 Claims, 11 Drawing Sheets

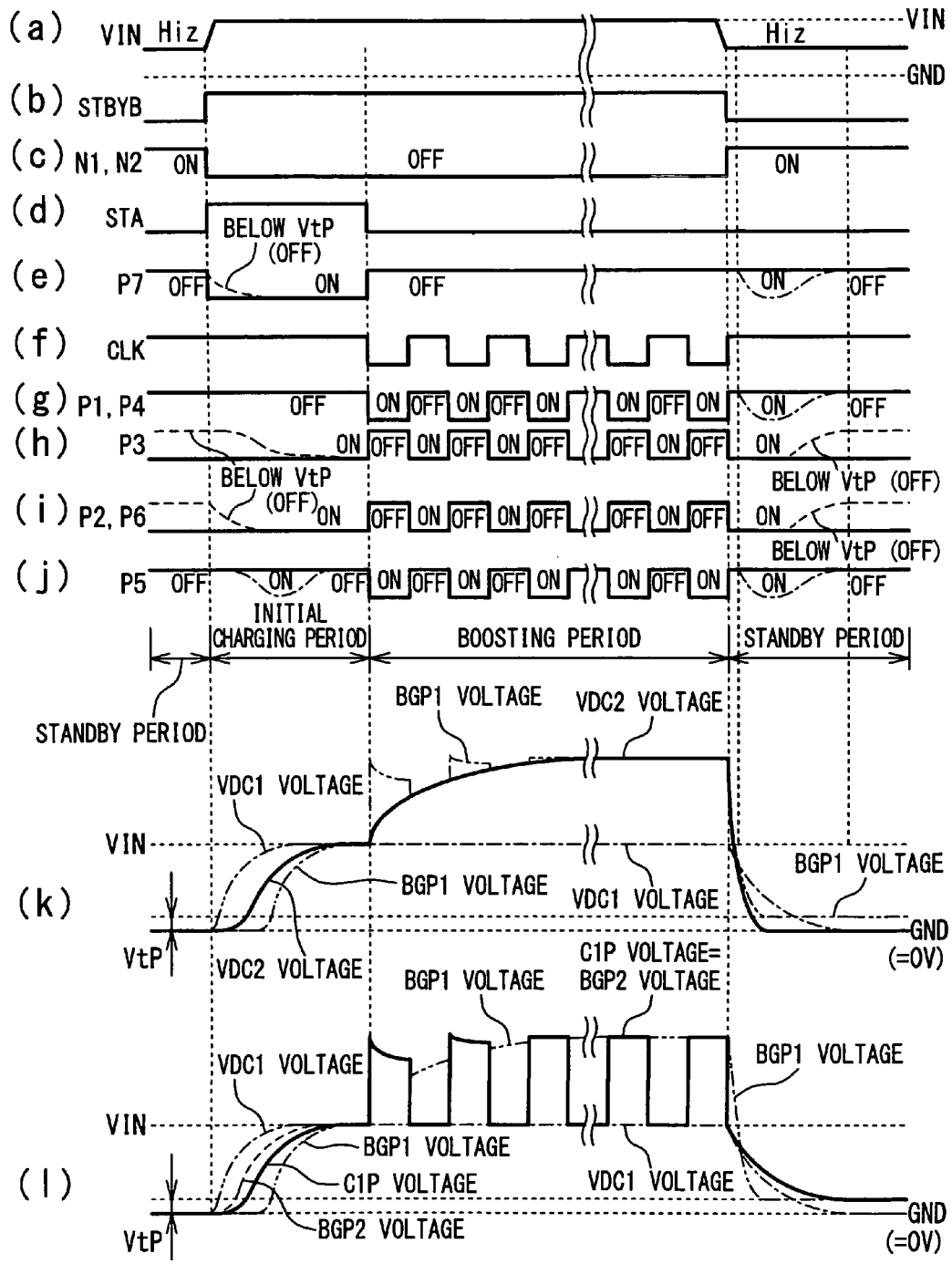

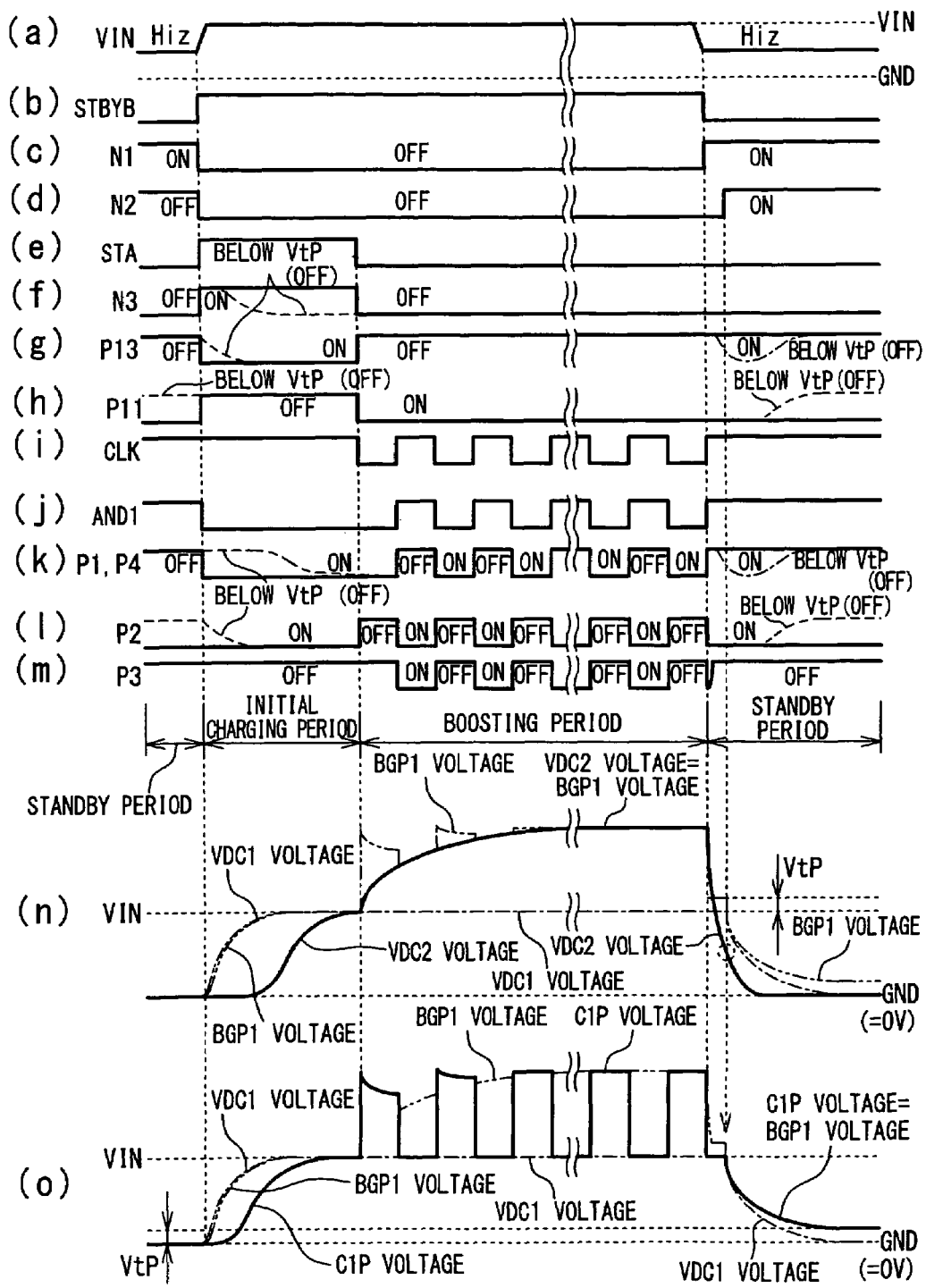

BOOSTING CIRCUIT AND BOOSTING METHOD

INCORPORATION BY REFERENCE

This patent application claims priority on convention based on Japanese Patent Application No. 2007-178235. The disclosure thereof is incorporated herein by reference.

BACKGROUND OF THE INVENTION

1. Field of the Invention

The present invention relates to a boosting circuit.

2. Description of Related Art

In some boosting circuits, charging and discharging P channel MOS transistors are formed to use an N-type well in a P-type semiconductor substrate or a P-type semiconductor layer as a back gate. In this type of boosting circuit, a parasitic bipolar transistor exists for each of the charging and discharging P channel MOS transistors. Some proposals are made to provide a boosting circuit which can prevent degradation of efficiency due to latch-up and reactive current by preventing the parasitic bipolar transistors of the charging and discharging P channel MOS transistors from being turned on in a boosting operation period during which a boosting capacitor is repeatedly charged and discharged.

However, in transition to an initial charging period during which a boosting capacitor and a smoothing capacitor are charged with an input voltage before start of a boosting operation and to a standby period during which the boosting operation is stopped and the voltages of the boosting capacitor and the smoothing capacitor are decreased to a zero voltage, it is impossible to prevent a base voltage from decreasing lower than an emitter voltage of the parasitic bipolar transistor of each of the charging and discharging P channel MOS transistors. As a result, the parasitic bipolar transistor is disadvantageously turned on to cause efficiency down due to the latch-up and the reactive current. There is a demand for a boosting circuit which can prevent the efficiency down due to the latch-up and the reactive current in the transition to the initial charging period as well as the standby period.

A related art boosting circuit is described in Japanese Patent Application Publication (JP-P2005-45934A). In this boosting circuit, each of charging and discharging P channel MOS transistors has a parasitic bipolar transistor. Hereinafter, this related art boosting circuit will be described with reference to FIGS. 1A, 1B and 2. A basic configuration of the boosting circuit 10 will be described with reference to FIGS. 1A and 1B. The boosting circuit 10 includes a charge pump circuit 11 for boosting an input voltage VIN supplied from an input terminal VDC1 to a twice voltage, a start circuit 12 for initially charging a smoothing capacitor C2 with the input voltage VIN before start of a boosting operation, and a standby circuit 13 for discharging the electric charges stored in a boosting capacitor C1 and a smoothing capacitor C2 to a ground voltage GND.

The charge pump circuit 11 has the boosting capacitor C1, the smoothing capacitor C2, P channel MOS transistors P1 to P6. Q1 shows a parasitic bipolar transistor to the MOS transistor P1. Q2D and Q2S are parasitic bipolar transistors to the MOS transistor P2. Level conversion circuits LS11 and LS21 are level shifter circuits for converting the voltage level of an input logical signal. The level converting circuit LS11 converts an input low level of the voltage GND and an input high level of a voltage VCC into the voltage GND and the voltage VDC1, respectively. The level converting circuit LS21 converts a low level of the voltage GND and a high level of the voltage VCC into the voltage GND and a voltage VDC2, respectively. The MOS transistors P1 and P2 are connected in series, and a source of the MOS transistor P1 and a drain of the MOS transistor P2 are connected to an output terminal VDC2 and the input terminal VDC1, respectively. The boosting capacitor C1 is connected between a node C1M as an output of the level converting circuit LS11 and a node C1P between the MOS transistors P1 and P2. The smoothing capacitor C2 is connected between the output terminal VDC2 and the ground voltage GND.

The MOS transistors P5 and P6 function a switch for connecting a back gate BGP2 of the MOS transistor P2 as a charging MOS transistor to one of a source and a drain of the MOS transistor P2. The MOS transistors P5 and P6 are connected in series in parallel to the MOS transistor P2, and sources of the MOS transistors P5 and P6 are commonly connected, and back gates of the MOS transistors P5 and P6 are connected to the sources, respectively. The MOS transistors P3 and P4 function a switch for connecting a back gate BGP1 of the MOS transistor P1 as a discharging MOS transistor to one of a source and a drain of the MOS transistor P1. Back gates of the MOS transistors P3 and P4 are connected to sources, respectively, and the sources are commonly connected, and the MOS transistors P3 and P4 are connected in series in parallel to the MOS transistor P1. The sources of the MOS transistors P3 and P4 are connected to the back gate BGP1.

Gates of the MOS transistors P1, P4 and P5 are directly connected to an output of the level converting circuit LS21, and gates of the MOS transistors P2, P3 and P6 are connected to the output of the level converting circuit LS21 through an inverter INV21. A clock signal CLK is connected to an input of the level converting circuit LS21 and is connected to an input of the level converting circuit LS11 through an inverter INV11. The MOS transistors P1, P4, P5 and the MOS transistors P2, P3, P6 are complimentarily turned on/off in response to the clock signal CLK.

The start circuit 12 has a P channel MOS transistor P7. Q7 is a parasitic bipolar transistor to the MOS transistor P7. A level converting circuit LS22 converts a voltage level of the input logical signal. The level converting circuit LS22 converts an input low level of the voltage GND and an input high level of the voltage VCC into the voltage GND and the voltage VDC2, respectively. A drain of the MOS transistor P7 is connected to the input terminal VDC1 and a source of the MOS transistor P7 is connected to the output terminal VDC2. The gate of the MOS transistor P7 is connected to an output of the level converting circuit LS22. A start signal STA is connected to the input of the level converting circuit LS22 through an inverter INV12. The MOS transistor P7 is turned on by setting the start signal STA to the high level.

The standby circuit 13 has N channel MOS transistors N1 and N2. A drain of the MOS transistor N1 is connected to the output terminal VDC2 and a source of the MOS transistor N1 is connected to the ground voltage GND. A drain of the MOS transistor N2 is connected to the input terminal VDC1 and a source of the MOS transistor N2 is connected to the ground voltage GND. Gates of the MOS transistors N1 and N2 are connected to a standby signal STBYB through an inverter INV13. The MOS transistors N1 and N2 are turned on by setting the standby signal STBYB to the low level.

The power supply voltage VCC of the inverters INV11, INV12 and INV13 is set to be VCC≦VIN in the boosting operation period. Especially, in case of only an operation in the condition of VCC=VIN during the boosting operation period, the level converting circuit LS11 can be omitted.

A basic operation of the boosting circuit 10 will be described with reference to FIGS. 1A, 1B and 2. The basic operation period includes an initial charging period, a boosting operation period, and a standby period. In the initial charging period, the input voltage VIN is supplied from the input terminal VDC1 and is applied to the boosting capacitor C1 and the smoothing capacitor C2 to initially charge the boosting capacitor C1 and the smoothing capacitor C2 before start of the boosting operation. In the boosting operation period, the input voltage VIN is boosted to twice voltage. In the standby period, the boosting operation stops and electrical charges stored in the boosting capacitor C1 and the smoothing capacitor C2 are discharged to the ground voltage GND. A series of operation period of the boosting circuit 10 is controlled in an order of the standby period, the initial charging period, the boosting operation period and the standby period, as shown in FIG. 2. The input voltage VIN supplied to the input terminal VDC1 is controlled in an outside of the boosting circuit 10 according to a value of the standby signal STBYB. The input voltage VIN is supplied to the input terminal VDC1 when the standby signal STBYB is in the high level, and the input terminal VDC1 is opened (no voltage is supplied) when the standby signal STBYB is in the low level.

First, the boosting operation period will be described. During this period, the start signal STA set to the low level is supplied to the start circuit 12. Accordingly, the MOS transistor P7 is in an off state at all times during the boosting operation period and the input terminal VDC1 is electrically separated from the output terminal VDC2. The standby signal STBYB set to the high level is supplied to the standby circuit 13. Accordingly, the MOS transistors N1 and N2 are in the off state during the boosting operation period, and the input terminal VDC1 and the output terminal VDC2 are electrically separated from the ground voltage GND. When the clock signal CLK of the high level is supplied to the charge pump circuit 11, the output node C1M of the level converting circuit LS11 is in the ground voltage. Also, the MOS transistors P2, P3 and P6 are turned on and the MOS transistors P1, P4 and P5 are turned off. At this time, the input voltage VIN is supplied through the input terminal VDC1 to the boosting capacitor C1. That is, the MOS transistor P2 serves as a charging MOS transistor, and performs a charging operation of the boosting capacitor C1.

Next, when the clock signal CLK of the low level is supplied, the output node C1M of the level converting circuit LS11 is in the voltage VDC1. As a result, the MOS transistors P2, P3 and P6 are turned off and the MOS transistors P1, P4 and P5 are turned on. At this time, the electric charges is discharged from the boosting capacitor C1, and a boosted voltage (=VIN voltage×2) obtained by adding the voltage VDC1 (=voltage VIN) to the charge voltage of the boosting capacitor C1 is outputted from the output terminal VDC2 to charge the smoothing capacitor C2. That is, the MOS transistor P1 serves as a discharging MOS transistor and the level converting circuit LS11 serves as a voltage adding circuit, and a discharging operation of the boosting capacitor C1 is performed along with an adding operation of the power source voltage. By repeating this on/off control, the boosted voltage is outputted to the output terminal VDC2. When an output time of the ground voltage GND from the level converting circuit LS11 and an ON time of the MOS transistor P2 are controlled so that a charge voltage of the boosting capacitor C1 may be saturated, the boosted voltage (=VIN×2) which is twice as high as the input voltage VIN on the input terminal VDC1 is outputted to the output terminal VDC2. When the output time of the ground voltage GND from the level converting circuit LS11 and the ON time of the MOS transistor P2 are controlled so that the charge voltage of the boosting capacitor C1 may be unsaturated, the boosted voltage is lower than a voltage which is twice as high as the voltage VIN (=VIN voltage) of the input terminal VDC1.

Next, operations of the parasitic bipolar transistors Q1 and Q2D during the above-mentioned boosting operation period will be described. In the charging operation of the boosting capacitor C1 in response to the clock signal CLK of the high level, the MOS transistors P2, P3 and P6 are turned on. At this time, the back gate BGP2 of the MOS transistor P2 is connected to the drain (input terminal VDC1) and the back gate BGP1 of the MOS transistor P1 is connected to the source (output terminal VDC2). Thus, the MOS transistor P2 is turned on, while the parasitic bipolar transistor Q2D is not turned on since a base (back gate BGP2) voltage becomes the same as an emitter (input terminal VDC1) voltage. Furthermore, the MOS transistor P3 is turned on, and the back gate BGP1 of the MOS transistor P1 in the OFF state is connected to the source voltage higher than the drain. For this reason, no current flows backward from the smoothing capacitor C2 to the drain of the MOS transistor P1.

Next, the discharging operation of the boosting capacitor C1 will be described. In response to the clock signal CLK of the low level, the MOS transistors P1, P4 and P5 are turned on, and the MOS transistors P2, P3 and P6 are turned off. Also, the back gate of the MOS transistor P2 is connected to the source (node C1P) of the MOS transistor P1 and the back gate BGP1 of the MOS transistor P1 is connected to the drain (node C1P) of the MOS transistor P1. At this time, the MOS transistor P1 is turned on, while the parasitic bipolar transistor Q1 is not turned on since a base (back gate BGP1) voltage becomes the same as an emitter (node C1P) voltage. At this time, the MOS transistor P5 is turned on, and the back gate BGP2 of the MOS transistor P2 in the OFF state is connected to the source of the MOS transistor P2 on a higher voltage side than the drain. For this reason, no current flows backward from the boosting capacitor C1 to a drain side of the MOS transistor P2.

As described above, since the back gate BGP2 of the MOS transistor P2 is connected to the drain so that the base (back gate BGP2) voltage of the parasitic bipolar transistor Q2D may become the same as the emitter (input terminal VDC1) voltage in the charging operation of the boosting capacitor C1 and the back gate BGP1 of the MOS transistor P1 is connected to the drain so that the base (back gate BGP1) voltage of the parasitic bipolar transistor Q1 becomes the same as the emitter (node C1P) voltage in the discharging operation of the boosting capacitor C1, during a boosting operation period of the charge pump circuit 11, the parasitic bipolar transistors Q2D and Q1 are turned on.

Next, the initial charging period will be described. During this period, the start signal STA set to the high level is supplied to the start circuit 12. Accordingly, since the MOS transistor P7 is turned on during the initial charging period to connect the input terminal VDC1 to the output terminal VDC2, the smoothing capacitor C2 is initially charged to the voltage VIN on the input terminal VDC1. The standby signal STBYB set to the high level is supplied to the standby circuit 13. Accordingly, the MOS transistors N1 and N2 are turned off during the initial charging period and the input terminal VDC1 and the output terminal VDC2 are electrically separated from the ground voltage GND. The clock signal CLK set to the high level is supplied to the charge pump circuit 11. The output node C1M of the level converting circuit LS11 is in the ground voltage, the MOS transistors P2, P3 and P6 are turned on, and the MOS transistors P1, P4 and P5 are turned off. Accordingly, during the initial charging period, the boosting capacitor C1 is initially charged to the voltage VIN on the input terminal VDC1.

Next, the standby period will be described. During this period, the start signal STA set to the low level is supplied to the start circuit 12. Accordingly, the MOS transistor P7 is turned off in the standby period and the input terminal VDC1 is electrically separated from the output terminal VDC2. The clock signal CLK set to the high level is supplied to the charge pump circuit 11. The output node C1M of the level converting circuit LS11 is in the ground voltage GND, the MOS transistors P2, P3 and P6 are turned on, and the MOS transistors P1, P4 and P5 are turned off. Since the MOS transistor P2 is turned on during the standby period, the boosting capacitor C1 is connected to the input terminal VDC1. The standby signal STBYB set to the low level is supplied to the standby circuit 13 and the MOS transistors N1 and N2 are turned on during the standby period. Accordingly, the input terminal VDC1 and the output terminal VDC2 are connected to the ground voltage GND, and electrical charges stored in the boosting capacitor C1 and the smoothing capacitor C2 are discharged to the ground voltage GND.

Transition from the standby period to the initial charging period of the related art boosting circuit 10 will be described with reference to FIGS. 1A, 1B and 2. In the transition from the standby period to the initial charging period, when the MOS transistors N1 and N2 are turned off and the input voltage VIN is supplied through the input terminal VDC1 to the boosting circuit 10, the voltage on the input terminal VDC1 starts to rise from the ground voltage GND to the VIN voltage. At this time, the MOS transistor P2, P6, P7, drains of which are connected to the input terminal VDC1, are controlled to be turned on according to the clock signal CLK and the start signal STA during the initial charging period.

However, the voltage VDC1 is equal to the ground voltage GND immediately after start of the initial charging period. Also, the voltage VDC2 is equal to the ground voltage GND immediately after start of the initial charging period. Since level conversion functions of the level converting circuits LS21 and LS22 using the voltage VDC2 as a level conversion power supply voltage cannot be normally performed when the voltage VDC2 is VtP or less, the gate voltages of the MOS transistors P1, P4, P5 and P7 become undefined (voltage lower than [voltage VDC2+VtP]). Furthermore, a logical function of the inverter INV21 using the voltage VDC2 as the power supply voltage is not normally performed when the voltage VDC2 is the threshold voltage VtP or less of the P channel MOS transistor, and the gate voltages of the MOS transistors P2, P3 and P6 are also undefined (voltage lower than [voltage VDC2+VtP]). When the voltage VDC1 is in threshold voltage VtP or less of the P channel MOS transistor, gate voltages of the P channel MOS transistors P2, P6 and P7 are not sufficiently low. Therefore, the MOS transistors P2, P6 and P7 are turned off.

Thus, in start of rising of the voltage of the input terminal VDC1, since the gate voltages of the MOS transistors P2, P6 and P7 are not sufficiently low, the MOS transistors P2, P6 and P7 are turned off (voltage VDC1<VtP: turned off, voltage VDC1=about VtP: turned on with high resistance, a period represented by a dotted line in (h) of FIG. 2). For this reason, the voltage on the node C1P starts rising when the voltage VDC1 rises from [P2 gate voltage+VtP] and the MOS transistor P2 is turned on. Similarly, the voltage of the back gate BGP2 starts rising when the voltage VDC1 rises from [P6 gate voltage+VtP] and the MOS transistor P6 is turned on. Similarly, when the voltage VDC1 rises from [P7 gate voltage+VtP] and the MOS transistor P7 is turned on, the voltage of the output terminal VDC2 rises from the voltage starts. Meanwhile, the MOS transistor P5 is controlled to be logically turned off according to the clock signal CLK during the initial charging period. However, as described above, when the voltage of the output terminal VDC2 is about VtP or less, the gate voltage of the MOS transistor P5 is undefined (voltage lower than [voltage VDC2+VtP]). Thus, when the back gate BGP2 voltage becomes higher than [P5 gate voltage+VtP] and the gate voltage of the MOS transistor P5 becomes sufficiently low, the MOS transistor P5 is turned on (a period represented by a chain line in (j) of FIG. 2).

As described above, when the voltage of the input terminal VDC1 starts rising, any of the MOS transistors P2, P5 and P6 does not normally operate and the MOS transistors P2 and P6 are in the off state (voltage VDC1<VtP: turned off, voltage VDC1=about VtP: turned on with high resistance). Accordingly, it is impossible to prevent the base (back gate BGP2) voltage from falling lower than the emitter (input terminal VDC1) voltage of the parasitic bipolar transistor Q2D. In addition, since the gate voltage of the MOS transistor P5 is undefined, even when the MOS transistor P5 is turned on, it is impossible to prevent the base (back gate BGP2) voltage from falling lower than the emitter (input terminal VDC1) voltage of Q2D.

When the base voltage falls lowers than the threshold voltage of the parasitic bipolar transistor Q2D (generally, threshold voltage $V_{BE}$ of the bipolar transistor, $V_{BE}$=about 0.7 V), the parasitic bipolar transistor Q2D is turned on. Meanwhile, since the MOS transistor P7 is also turned on (voltage VDC1=VtP or less: turned off, about VtP: turned on with high resistance), the parasitic bipolar transistor Q7 cannot prevent the base (output terminal VDC2) voltage from falling lower than the emitter (input terminal VDC1) voltage. When the base voltage falls lower than the threshold voltage $V_{BE}$ of the parasitic bipolar transistor Q7, the parasitic bipolar transistor Q7 is turned on. In this manner, in the related art boosting circuit 10, in transition from the standby period to the initial charging period, it is impossible to prevent the base voltage from falling lower than the emitter voltage of the parasitic bipolar transistors Q2D and Q7. Since the parasitic bipolar transistors Q2D and Q7 are turned on, the reactive current and the latch-up disadvantageously occur during the initial charging period.

Next, a transition from the boosting operation period to the standby period in the related art boosting circuit 10 will be described. In the transition from the boosting operation period to the standby period, electrical charges stored in the capacitors C1 and C2 are discharged to the ground voltage GND.

First, a case will be described that there is a period during which a discharge time of the smoothing capacitor C2 is shorter than that of the boosting capacitor C1 so that the voltage VDC2 becomes lower than the voltage VDC1 and a node C1P voltage (for example, C1>C2). When the voltage VDC2 becomes lower than the voltage VDC1, the base (output terminal VDC2) voltage becomes lower than the emitter (input terminal VDC1) voltage of the parasitic bipolar transistor Q7. At this time, when the base voltage falls lower than the threshold voltage $V_{BE}$ of the parasitic bipolar transistor Q7, the parasitic bipolar transistor Q7 is turned on.

The MOS transistor P3 is controlled to be logically turned on in response to the clock signal CLK during the standby period, and the ground voltage GND is supplied to the gate of the MOS transistor P3. Thus, the output terminal VDC2 is electrically connected to the back gate BGP1. When the voltage VDC2 is lower than the node C1P voltage, the base (back gate BGP1) voltage falls lower than the emitter (node C1P)

voltage of the parasitic bipolar transistor Q1, following the voltage VDC2. When the base voltage decreases lower the threshold voltage $V_{BE}$ of the parasitic bipolar transistor Q1, the parasitic bipolar transistor Q1 is turned on.

Next, a case will be described that a discharge time of the smoothing capacitor C2 is slower than that of the boosting capacitor C1 and the voltage VDC2 is not lower than the voltage VDC1 and the node C1P voltage (for example, C1<C2). The MOS transistors P2 and P6 are controlled to be logically turned on according to the clock signal CLK during the standby period, and the ground voltage GND is supplied to the gate of the MOS transistors P2 and P6. Thus, the input terminal VDC1 is electrically connected to the back gate BGP2. When the voltage VDC1 is lower than the node C1P voltage, the base (back gate BGP2) voltage (=voltage VDC1) decreases lower than the emitter (node C1P) voltage of the parasitic bipolar transistor Q2S. Then, when the base voltage decreases lower than $V_{BE}$ of the parasitic bipolar transistor Q2S, the parasitic bipolar transistor Q2S is turned on.

As described above, in the related art boosting circuit 10, in transition from the boosting operation period to the standby period, it is impossible to prevent the base voltage from decreasing lower than the emitter voltages of the parasitic bipolar transistors Q1, Q2S and Q7. As shown in FIG. 2, when a discharge rate of the smoothing capacitor C2 is high, the parasitic bipolar transistors Q1 and Q7 are turned on. As shown in FIG. 3, when the discharge rate of the smoothing capacitor C2 is low, the parasitic bipolar transistor Q2S is turned on. Thus, in transition from the boosting operation period to the standby period, the reactive current and the latch-up may occur disadvantageously.

SUMMARY

In a first aspect of the present invention, a boosting circuit includes a boosting capacitor to which an input voltage is applied; a smoothing capacitor to which a boosted voltage is applied; a discharging MOS transistor configured to connect the boosting capacitor and the smoothing capacitor in a discharging operation during a boosting operation period such that charge stored in the boosting capacitor is discharged to the smoothing capacitor; and a charging MOS transistor configured to apply the input voltage to the boosting capacitor in a charging operation during the boosting operation period to charge up the charging capacitor. A back gate of the charging MOS transistor and a back gate of the discharging MOS transistor are connected to a common node, and the common node is connected to different voltages in the charging operation and the discharging operation.

In a first aspect of the present invention, a boosting method includes charging a boosting capacitor with an input voltage through a charging MOS transistor in a charging operation during a boosting operation period to charge up the charging capacitor; discharging charges stored in the boosting capacitor to a smoothing capacitor through a discharging MOS transistor; and connecting a common node to different voltages in the charging operation and the discharging operation. The common node is connected to a back gate of the charging MOS transistor and a back gate of the discharging MOS transistor.

According to the present invention, a boosting circuit in which no parasitic bipolar transistor is turned on during the boosting operation period as well as at transition and from the standby period to the initial charging period and from the boosting operation period to the standby period can be provided.

BRIEF DESCRIPTION OF THE DRAWINGS

The above and other objects, advantages and features of the present invention will be more apparent from the following description of certain embodiments taken in conjunction with the accompanying drawings, in which:

FIG. 2 shows an example of a timing chart of the boosting circuit according to the conventional technique;

FIG. 9 is a timing chart of the boosting circuit according to the third embodiment of the present invention.

DESCRIPTION OF THE PREFERRED EMBODIMENTS

Hereinafter, a boosting circuit of the present invention will be described in detail with reference to the attached drawings.

First Embodiment

Figure 1A:
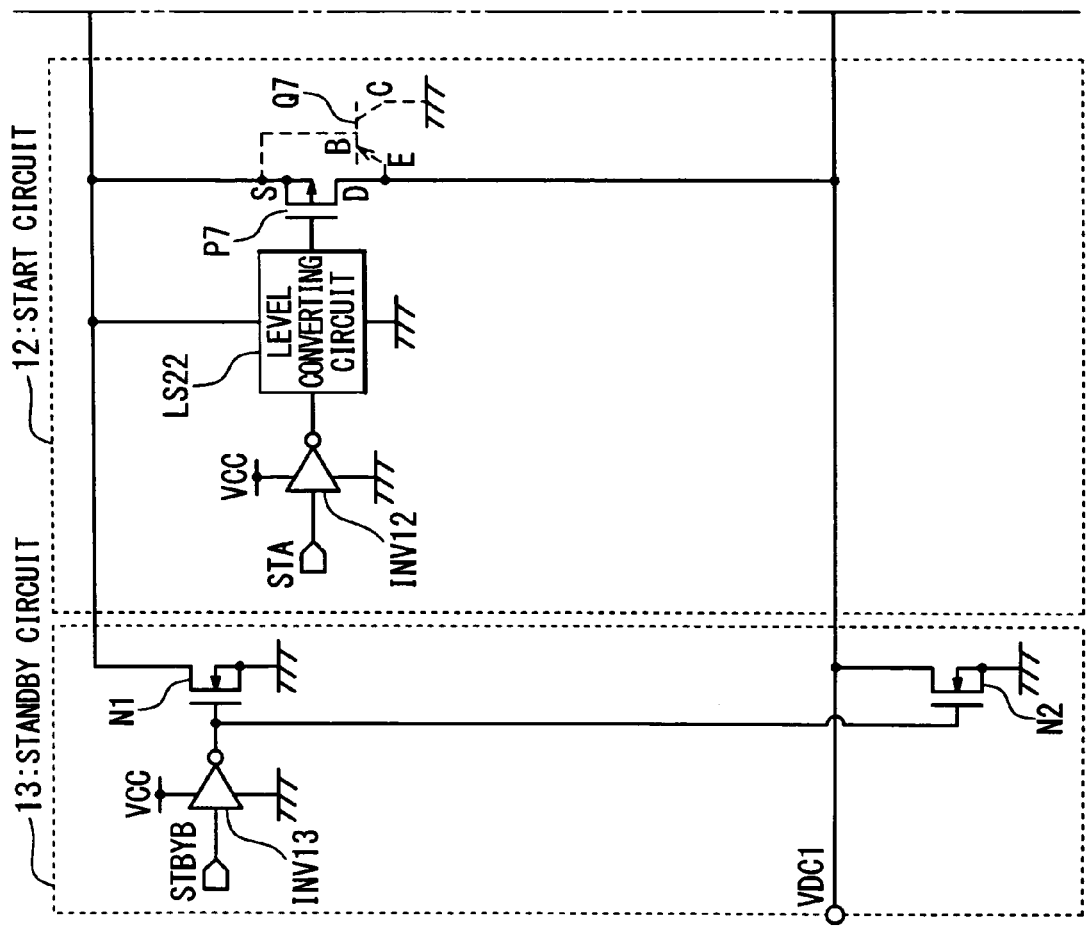
FIG. 1A is a circuit diagram of a boosting circuit according to a conventional technique.
Figure 1B:
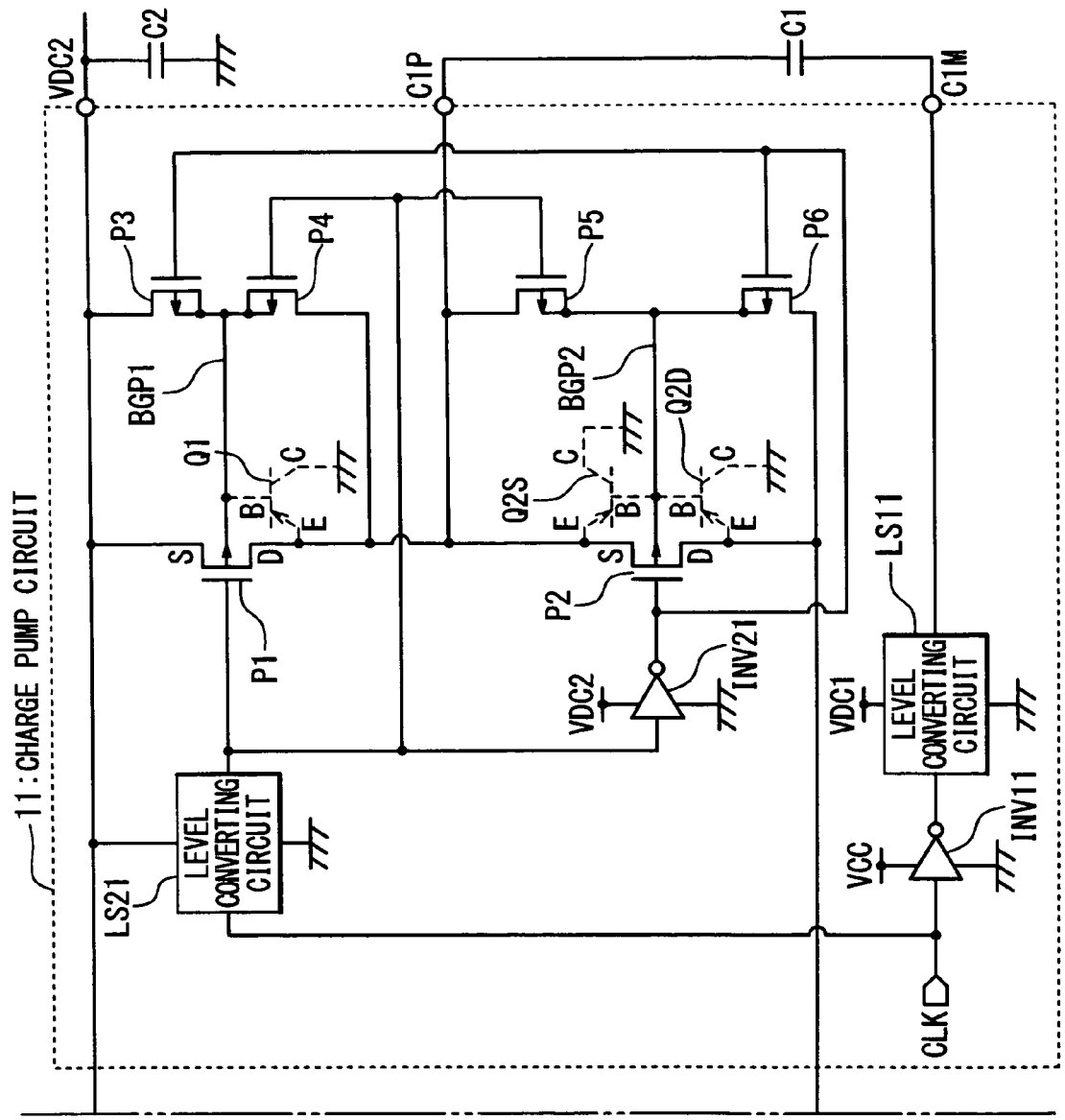
FIG. 1B is a circuit diagram of the boosting circuit according to the conventional technique.
Figure 3:
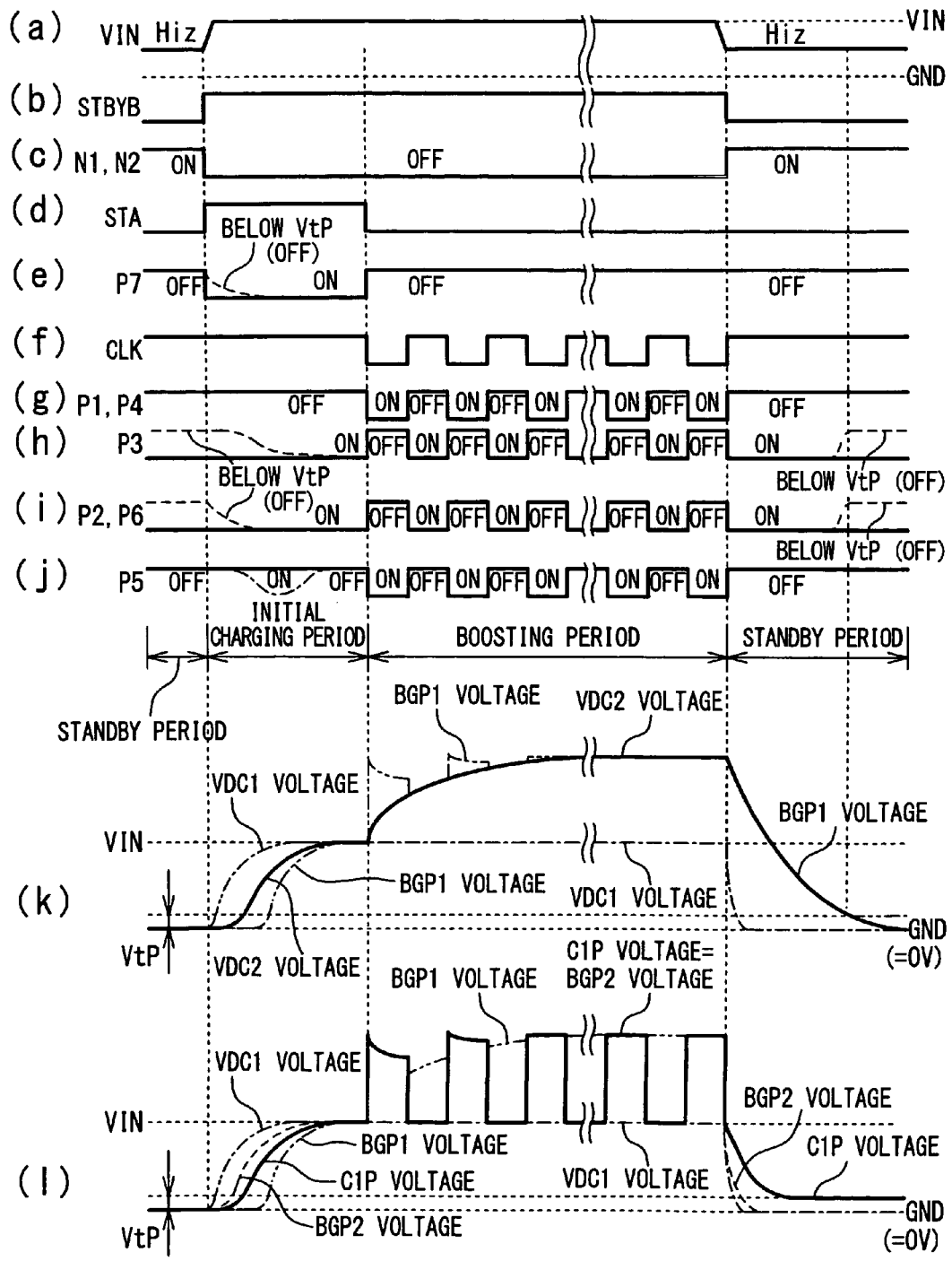
FIG. 3 shows another example of a timing chart of the boosting circuit according to the conventional technique.
Figure 4:
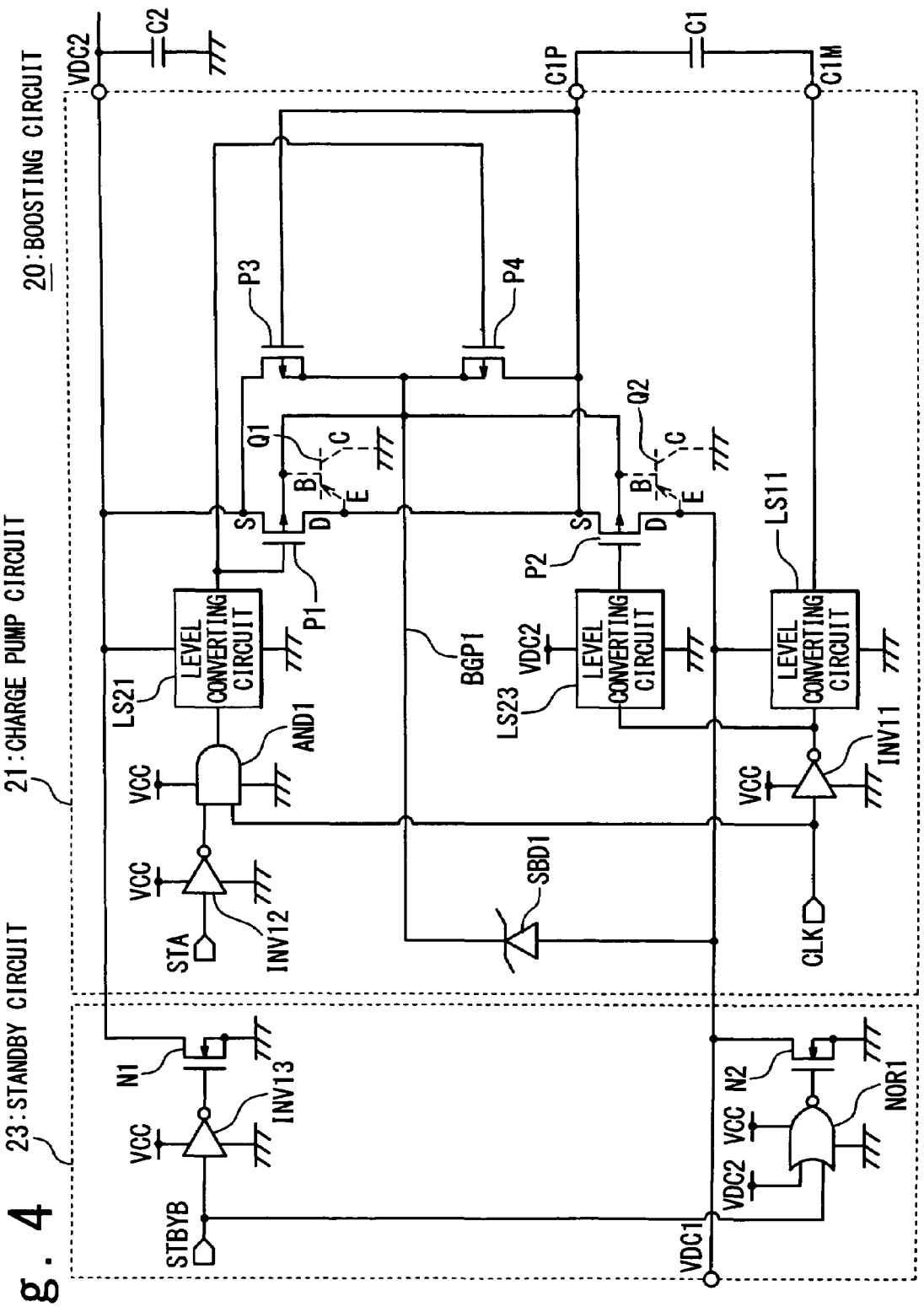
FIG. 4 is a circuit diagram of a boosting circuit according to a first embodiment of the present invention.

FIG. 4 is a circuit diagram showing a basic configuration of a boosting circuit 20 according to a first embodiment of the present invention. In FIG. 4, same components as those in FIGS. 1A and 1B are assigned with same reference numerals and the description thereof is omitted.

Referring to FIG. 4, the boosting circuit 20 includes a charge pump circuit 21 for boosting an input voltage VIN supplied from an input terminal VDC1 to twice voltages, and a standby circuit 23 for discharging electrical charges stored in the boosting capacitor C1 and the smoothing capacitor C2 to the ground voltage GND. The charge pump circuit 21 includes a boosting capacitor C1, a smoothing capacitor C2, P channel MOS transistors P1, P2, P3, and P4 and schottky-barrier diode SBD1. The MOS transistor P1 functions a discharging MOS transistor, and the MOS transistor P2 functions a charging MOS transistor. The MOS transistor P4 functions a first connection switch, and the MOS transistor P3 functions a second connection switch. Q1 shows a parasitic bipolar transistor to the MOS transistor P1, and Q2 shows a parasitic bipolar transistor to the MOS transistor P2. A level converting circuit LS23 as a first lock circuit converts an input low voltage level (voltage GND) and an input high voltage level (voltage VCC) into the voltage GND and the voltage VDC2, respectively. A back gate of the MOS transistor P2, and a source and a back gate of each of the MOS transistors P3 and P4 are commonly connected to the back gate BGP1 of the MOS transistor P1. By forming the MOS transistors P1, P2, P3 and P4 in a same N-type well layer (not shown), it becomes unnecessary to provide a distance between wells which are necessary if they are separately formed. An anode of the schottky-barrier diode SBD1 is connected to the input terminal VDC1 and a cathode of the schottky-barrier diode SBD1 is connected to the back gate BGP1 of the MOS transistor P1. Gates of the MOS transistors P1 and P4 are directly connected to the output of the level converting circuit LS21 as a second logic circuit, and a gate of the MOS transistor P2 is connected to the output of the level converting circuit LS23. A gate of the MOS transistor P3 is connected to the node C1P. A clock signal CLK is connected to one input of a 2-input AND circuit AND1 and connected to the input of the level converting circuit LS11 through the inverter INV11. A start signal STA is connected to the other input of the 2-input AND circuit AND1 through the inverter INV12. An output of the 2-input AND circuit AND1 is connected to the input of the level converting circuit LS21. During a boosting operation period, the MOS transistors P1 and P4 and are turned on and off in response to the clock signal CLK complimentarily to the MOS transistor P2. The MOS transistor P3 is turned on in case of voltage VDC2>[node C1P voltage+VtP] and turned off in case of voltage VDC2<[node C1P voltage+VtP].

The standby circuit 23 has N channel MOS transistors N1 and N2 as first and second switches. The gate of the MOS transistor N1 is connected to a standby signal STBYB through an inverter INV13, and the gate of the MOS transistor N2 is connected to the output of a 2-input NOR circuit NOR1 as a logic circuit to control the transistor N2. One input of the 2-input NOR circuit NOR1 is connected to the output terminal VDC2 and the other input is connected to the standby signal STBYB. By setting the standby signal STBYB to the low level, the MOS transistor N1 is turned on, to discharge the charges stored in the smoothing capacitor C2 to the ground voltage GND. Also, when the standby signal STBYB is set to the low level and the voltage VDC2 becomes lower than the voltage VCC (VCC≦VIN), the MOS transistor N2 is turned on.

The inverters INV11, INV12 and INV13, the 2-input AND circuit AND1, and the 2-input NOR circuit NOR1 are connected to the power supply voltage VCC. In the circuit configuration in the first embodiment, a relationship VCC≦VIN is attained during the boosting operation period. Especially, in case of VCC=VIN during the boosting operation period, the level converting circuit LS11 is unnecessary in FIG. 4.

Figure 5:
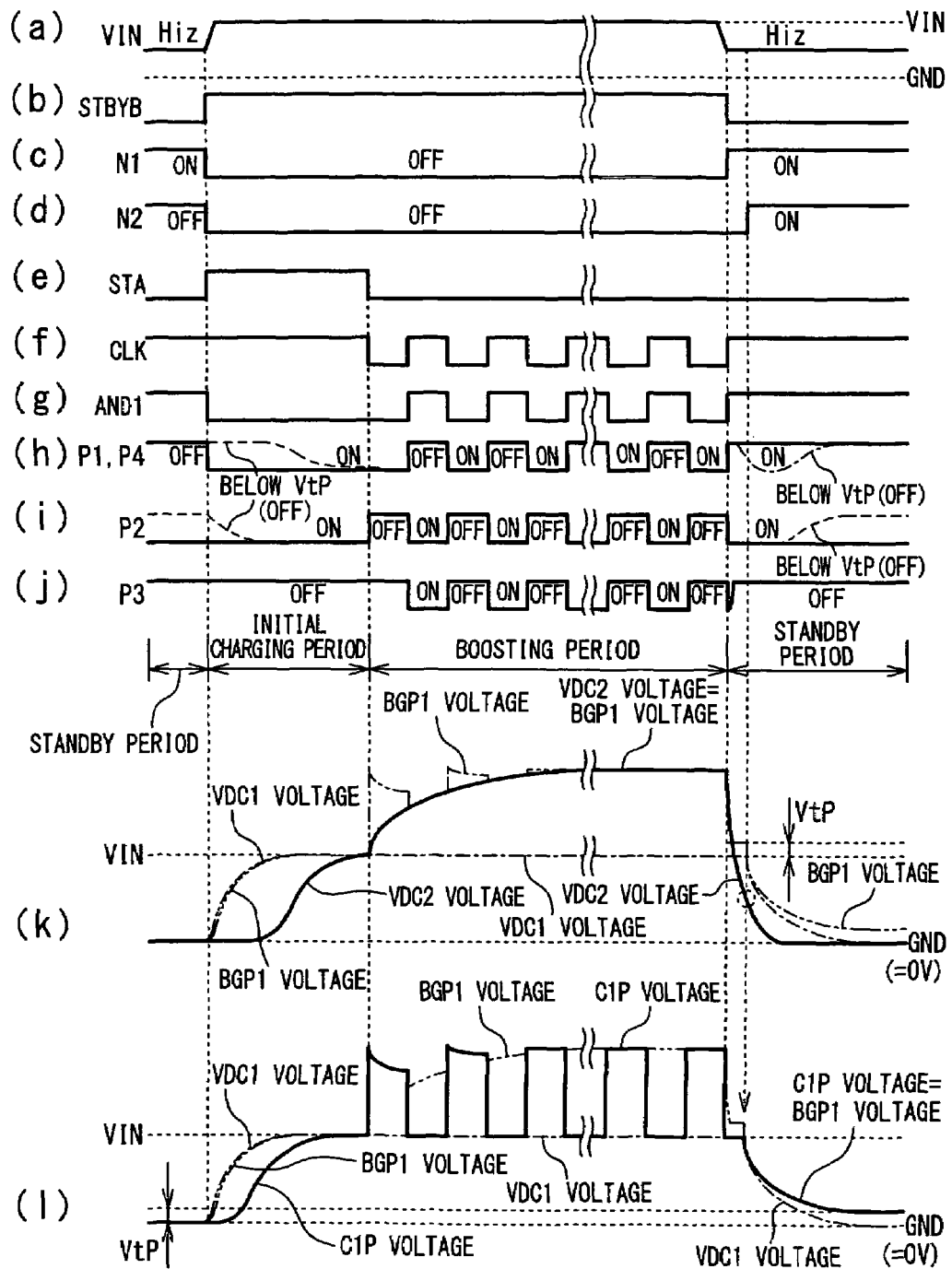
FIG. 5 is a timing chart of the boosting circuit according to the first embodiment of the present invention.

A basic operation of the boosting circuit 20 will be described with reference to FIGS. 4 and 5. First, the standby period will be described. In the standby period, the standby signal STBYB supplied to the standby circuit 23 is controlled to be set to the low level ((b) of FIG. 5) and the MOS transistor N1 is turned on ((c) of FIG. 5). The start signal STA supplied to the charge pump circuit 21 is controlled to be set to the low level ((e) of FIG. 5). Accordingly, one input of the AND circuit AND1 is in the high level. The clock signal CLK is controlled to be set to the high level. Accordingly, the other input of the AND circuit AND1 is in the high level. Accordingly, the MOS transistors P1 and P4 are turned off. Thus, the output terminal VDC2 is connected to the ground voltage GND through the MOS transistor N1 and electrical charges stored in the smoothing capacitor C2 are discharged to the ground voltage GND.

Also, since the clock signal CLK is in the high level, the output node C1M of the level converting circuit LS11 is in the ground voltage and the MOS transistor P2 is turned on. Accordingly, the boosting capacitor C1 is connected to the voltage of the input terminal VDC1. Meanwhile, when the voltage VDC2 is lower than the threshold voltage of the NOR circuit NOR1 (in case of voltage VDC2<threshold voltage of NOR circuit NOR1<voltage VCC, and VCC≦VIN), the MOS transistor N2 is turned on. Thus, the charges stored in the boosting capacitor C1 are discharged to the ground voltage GND through the MOS transistor N2.

Next, an initial charging period will be described. The standby signal STBYB supplied to the standby circuit 23 is controlled to be set to the high level ((b) of FIG. 5). Accordingly, the MOS transistors N1 and N2 are turned off during this period, and the input terminal VDC1 and the output terminal VDC2 are electrically separated from the ground voltage GND. The start signal STA supplied to the charge pump circuit 21 is controlled to be set to the high level ((e) of FIG. 5). Accordingly, the output of the AND circuit AND1 is set to the ground voltage GND ((g) of FIG. 5) and the MOS transistors P1 and P4 are controlled to be logically turned on. Also, the clock signal CLK supplied to the charge pump circuit 21 is controlled to be set to the high level ((f) of FIG. 5). Accordingly, since the outputs of the level converting circuits LS11 and LS23 are in the ground voltage GND, the output node C1M of the level converting circuit LS11 is in the ground voltage and the MOS transistor P2 is controlled to be logically turned on ((i) of FIG. 5). However, immediately after start of the initial charging period, the voltage VDC1 is equal to the ground voltage GND ((l) of FIG. 5). At the same time, the voltage VDC2 is equal to the ground voltage GND. Thus, when the voltage VDC1 is VtP or less, the MOS transistor P2 is turned off. When the voltage VDC2 is about VtP or less, the level converting functions of the level converting circuits LS21 and LS23 using the voltage VDC2 as level conversion power supply voltage are not normally performed. For this reason, the gate voltages of the MOS transistors P1 and P2 and P4 become undefined to be voltage lower than [voltage VDC2+VtP]. At start of rising of the voltage VDC1, since the MOS transistor P2 is turned off (voltage VDC1<VtP: turned off, voltage VDC1=about VtP: turned on with high resistance, a period represented by a dotted line in (i) of FIG. 5), the node C1P voltage rises ((l) of FIG. 5) after the voltage VDC1 rises from [P2 gate voltage+VtP] so that the MOS transistor P2 is turn on. The drains of the MOS transistors P1 and P4 are connected to the node C1P. Accordingly, until the node C1P voltage rises, the MOS transistors P1 and P4 are turned off (node C1P voltage<VtP: turned off, node C1P voltage=about VtP: turned on with high resistance, a period represented by a dotted line in (h) of FIG. 5). The output terminal VDC2 voltage rises ((k) of FIG. 5), after the node C1P voltage rises from [P1 gate voltage+VtP] so that the MOS transistor P1 is turned on. In this manner, the boosting capacitor C1 and the smoothing capacitor C2 are initially charged with the input voltage VIN. During this period, since a relationship of VDC1≧C1P≧VDC2 is maintained, the MOS transistor P3 is turned off ((j) of FIG. 5). The voltage VIN is supplied from the input terminal VDC1 to the back gate BGP1 through the schottky-barrier diode SBD1 as a component of a supplying circuit.

Next, the boosting operation period will be described. During this period, since the start signal STA is controlled to be in the low level ((e) of FIG. 5), the 2-input AND circuit AND1 outputs a logical signal of the same phase as the clock signal CLK ((g) FIG. 5). Accordingly, during the boosting operation period, the MOS transistors P1 and P4 are turned on/off in response to the clock signal CLK ((h) of FIG. 5) and the MOS transistor P2 is complimentarily turned off/on in response to the clock signal CLK ((i) of FIG. 5). When the clock signal CLK of the high level is supplied to the charge pump circuit 21, the output node C1M of the level converting circuit LS11 is in the ground voltage GND, the MOS transistor P2 is turned on and the MOS transistors P1 and P4 are turned off. Since the voltage VDC2 (VIN×2) becomes sufficiently higher than [node C1P voltage+VtP], the MOS transistor P3 is turned on ((j) of FIG. 5) and the voltage of the back gate BGP1 becomes a same voltage as the voltage VDC2 (back gate BGP1 voltage=voltage VDC2, (k) of FIG. 5). At this time, the MOS transistor P2 is turned on, and the boosting capacitor C1 is charged with the input voltage VIN supplied from the input terminal VDC1 ((l) of FIG. 5).

Next, when the clock signal CLK of the low level is supplied, the output C1M of the level converting circuit LS11 is set to the voltage VDC1. The MOS transistor P2 is turned off and the MOS transistors P1 and P4 are turned on. Since the node C1P voltage becomes (VIN×2) which is higher than the voltage VDC2, the MOS transistor P3 is turned off. The MOS transistor P4 is turned on, so that the voltage of the back gate BGP1 is set to a same voltage as the node C1P voltage (back gate BGP1 voltage=node C1P voltage). At this time, the MOS transistor P1 is turned on so that the boosting capacitor C1 discharges, and the boosted voltage (VIN×2) obtained by adding the input terminal voltage VDC1 (VIN) to a charge voltage of the boosting capacitor C1 is outputted from the output terminal VDC2 such that the smoothing capacitor C2 is charged.

Next, the operation of the parasitic bipolar transistors Q1 and Q2 during the above-mentioned boosting operation will be described. First, the operation when the clock signal CLK of the high level is supplied, that is, the charging operation of the boosting capacitor C1 will be described. At this time, the back gate BGP1 common to the MOS transistors P1, P2, P3 and P4 is connected to the output terminal VDC2 by turning on the MOS transistor P3. Here, although the MOS transistor P2 is turned on, the parasitic bipolar transistor Q2 is not turned on because the emitter (input terminal VDC1) voltage is lower than the base (back gate BGP1) voltage. Furthermore, since the MOS transistors P1 and P4 are turned off and the MOS transistor P3 is turned on, the common back gate BGP1 of the MOS transistor P1 is connected to the source (output terminal VDC2) voltage higher than the drain (node C1P) voltage in the MOS transistor P1. Thus, no current flows backward from the smoothing capacitor C2 to the drain of the MOS transistor P1.

Subsequently, the operation when the clock signal CLK of the low level is supplied, that is, the discharging operation of the boosting capacitor C1 will be described. At this time, the MOS transistors P1 and P4 are turned on and the MOS transistors P2 and P3 are turned off. Since the MOS transistor P4 is turned on, the common back gate BGP1 is connected to the node C1P. Here, although the MOS transistor P1 is turned on, the parasitic bipolar transistor Q1 is not turned on because the base (back gate BGP1) voltage is the same as the emitter (node C1P) voltage. Furthermore, since the MOS transistor P2 is turned off and the MOS transistor P4 is turned on, the common back gate BGP1 of the MOS transistor P2 is connected to the source (node C1P) voltage higher than the drain (input terminal VDC1) voltage in the MOS transistor P2. Thus, no current flows backward from the boosting capacitor C1 to the drain of the MOS transistor P2. As described above, during the boosting operation period of the charge pump circuit 21, the parasitic bipolar transistors Q2 and Q1 are not turned on.

Next, the standby period will be described. The start signal STA supplied to the charge pump circuit 21 is controlled to be set into the low level. Accordingly, one input of the AND circuit AND1 is at the high level. The clock signal CLK is controlled to be set to the high level. Accordingly, the other input of the AND circuit AND1 is in the high level. Thus, the MOS transistors P1 and P4 are turned off. Also, since the clock signal CLK is in the high level, the output node C1M of the level conversion circuit LS11 is in the ground voltage GND and the MOS transistor P2 is turned on. Thus, the boosting capacitor C1 is connected to the input terminal VDC1. The standby signal STBYB supplied to the standby circuit 23 is controlled to be set to the low level. At this time, since the MOS transistor N1 is turned on, the output terminal VDC2 is connected to the ground voltage GND and electrical charges stored in the smoothing capacitor C2 are discharged to the ground voltage GND.

Meanwhile, after the voltage VDC2 becomes lower than the threshold voltage of the NOR circuit NOR1 (in case of voltage VDC2<threshold voltage of NOR circuit NOR1<voltage VCC, VCC≦VIN), the MOS transistor N2 is turned on. For this reason, decrease of the voltage VDC2 to the ground voltage GND starts earlier than decrease of the voltage VDC1 to the ground voltage GND ((k) and (l) of FIG. 5). Thus, without depending on a difference between the discharge time of the boosting capacitor C1 and the discharge time of the smoothing capacitor C2 (for example, in case of capacity of C1<C2, discharge time of C1<discharge time C2), the order of decrease of voltage is kept constant. Since the MOS transistor P3 is turned on during a period of voltage VDC2>[node C1P voltage+VtP], the back gate BGP1 voltage is equal to the voltage VDC2. Since the MOS transistor P3 is turned off in case of voltage VDC2≦[node C1P voltage+VtP], the back gate BGP1 voltage is maintained (natural discharge state).

Furthermore, in case of [voltage VDC2<(node C1P voltage]−VtP], following the voltage VDC2, the gate voltage of the MOS transistors P1 and P4 falls through the level converting circuit LS21. Accordingly, the MOS transistors P1 and P4 are turned on. The MOS transistor P4 is turned on, so that the back gate BGP1 is connected to the node C1P. For this reason, the back gate BGP1 voltage becomes equal to the node C1P voltage (=voltage VDC1) through the MOS transistor P4. Even if the MOS transistor N2 is turned on and the voltage VDC1 and the node C1P voltage start to fall to the ground voltage GND, the MOS transistors P2 and P4 are turned on in case of voltage VDC1>VtP. Accordingly, a relationship of back gate BGP1 voltage=node C1P voltage (=voltage VDC1) is maintained. In case of voltage VDC1<VtP, the MOS transistors P2 and P4 are turned off and the back gate BGP1 voltage and the node C1P voltage are naturally discharged.

In the boosting circuit 20 in this example, the back gate of the charging P channel MOS transistor P2, and sources and back gates of the MOS transistors P3 and P4 are commonly connected to the back gate BGP1 of the discharging P channel MOS transistor P1 and the a connection switch of the MOS transistors P3 and P4 performs connection control of the back gate BGP1 to the source or drain of the P channel MOS transistor P1. Thus, the base voltages of the parasitic bipolar transistors Q1 and Q2 are equal to the back gate BGP1 voltage. Furthermore, an anode of the schottky-barrier diode SBD1 is connected to the input terminal VDC1 and the cathode of the schottky-barrier diode SBD1 is connected to the back gate BGP1. Accordingly, during the initial charging period, the input voltage VIN is supplied from the input terminal VDC1 to the back gate BGP1 through the schottky-barrier diode SBD1. The threshold voltage VfSBD of the schottky-barrier diode SBD1 is generally about 0.1 V and is lower than $V_{BE}$ (=about 0.7 V) of the parasitic bipolar transistor. Due to the effect of this difference in threshold voltage ($V_{BE}$−VfSBD about 0.6 V), during the initial charging period, it is possible to prevent the base (back gate BGP1) voltage from decreasing lower than the emitter (input terminal VDC1) voltage of the parasitic bipolar transistor Q2. Accordingly, the parasitic bipolar transistor Q2 is not turned on.

Similarly, it is possible to prevent the base (back gate BGP1) voltage from decreasing lower than the emitter (node C1P) voltage of the parasitic bipolar transistor Q1. Accordingly, the parasitic bipolar transistor Q1 is not turned on.

In transition from the boosting operation period to the standby period, the MOS transistor N2 is turned on after the voltage VDC2 becomes lower than the threshold voltage of the NOR circuit NOR1 (in case of voltage VDC2<threshold voltage of NOR circuit NOR1<voltage VCC, VCC≦VIN). Since the MOS transistor P3 is turned on during the period of voltage VDC2>[node C1P voltage+VtP], the back gate BGP1 voltage becomes equal to the voltage VDC2. Since the MOS transistor P3 is turned off in case of voltage VDC2≦[node C1P voltage+VtP], the back gate BGP1 voltage is maintained (natural discharge state). In case of voltage VDC2<[node C1P voltage−VtP], the gate voltage of the MOS transistors P1 and P4 decreases through the level converting circuit LS21, following the voltage VDC2. At this time, the MOS transistors P1 and P4 are turned on and the back gate BGP1 is connected to the node C1P. For this reason, the back gate BGP1 voltage becomes equal to the node C1P voltage (=voltage VDC1) through the MOS transistor P4. Even if the MOS transistor N2 is turned on so as to start decreases of the voltage VDC1 and the node C1P voltage to the ground voltage, the MOS transistors P2 and P4 are turned on in case of voltage VDC1>VtP. Thus, the relationship of back gate BGP1 voltage=node C1P voltage (=voltage VDC1) is maintained. The MOS transistors P2 and P4 are turned off in case of voltage VDC1<VtP, and the back gate BGP1 voltage and the node C1P voltage are naturally discharged.

As described above, during the transition period, the back gate BGP1 voltage is equal to the voltage VDC2 in case of voltage VDC2>[node C1P voltage+VtP], and the back gate BGP1 voltage is equal to the node C1P voltage (=voltage VDC1) in case of voltage VDC2<[node C1P voltage−VtP]. That is, the back gate BGP1 voltage is kept high. For this reason, it is possible to prevent the base (back gate BGP1) voltage of Q1 and Q2 from decreasing lower than the emitter (node C1P) voltage of the parasitic bipolar transistor Q1 and the emitter (input terminal VDC1) voltage of the parasitic bipolar transistor Q2D. Thus, the parasitic bipolar transistors Q1 and Q2 are not turned on.

It should be noted that although the boosting circuit for boosting the voltage to twice is used as the boosting circuit 20 in the first embodiment, a boosting circuit for boosting voltage to integer times can be adopted.

Second Embodiment

Figure 6:
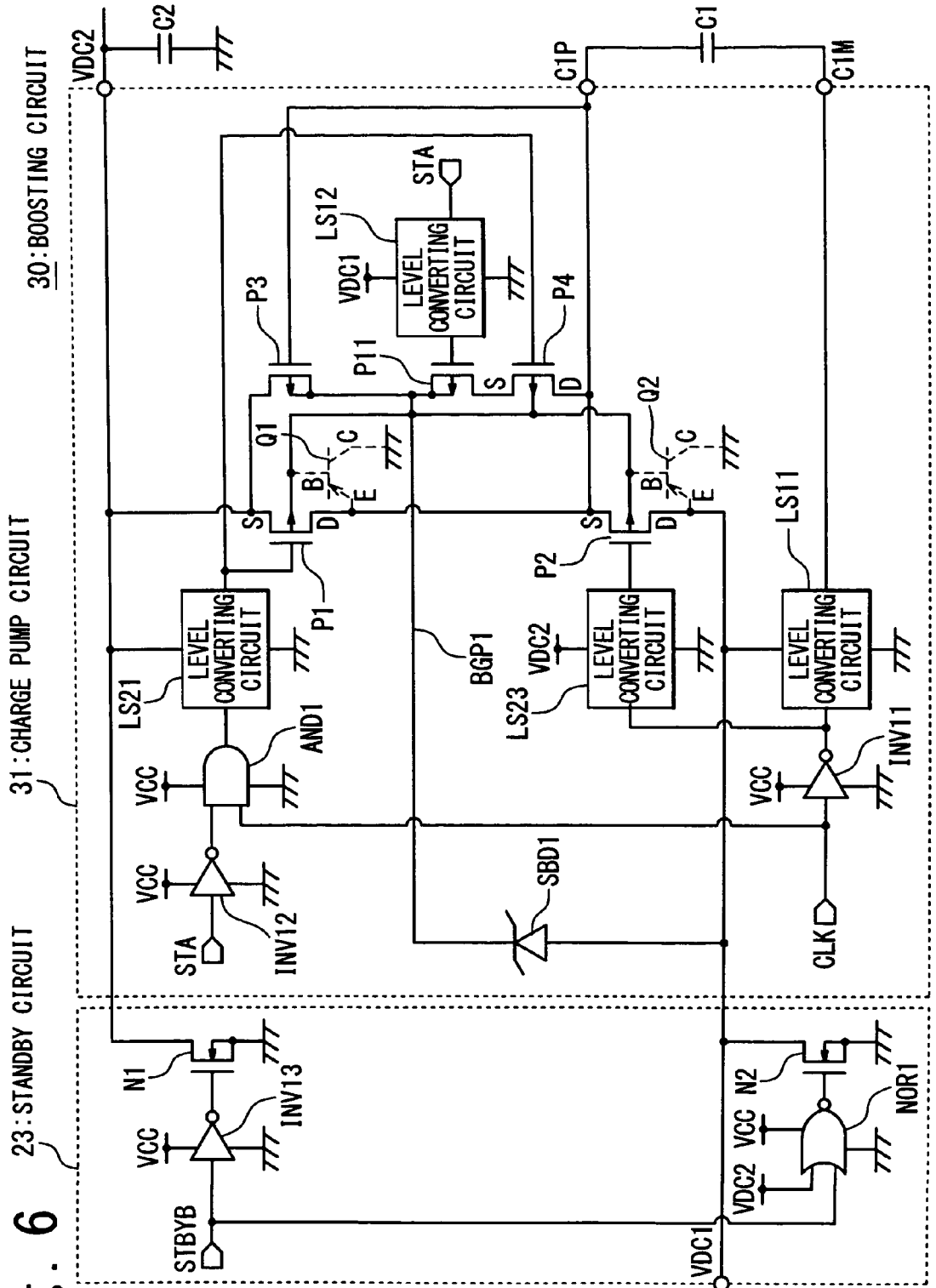
FIG. 6 is a circuit diagram of a boosting circuit according to a second embodiment of the present invention.

Hereinafter, FIG. 6 is a circuit diagram showing a boosting circuit 30 according to a second embodiment of the present invention will be described with reference to FIG. 6. Same reference numerals are assigned to same components as those in FIGS. 1A, 1B and 4 and description thereof is omitted.

Referring to FIG. 6, the boosting circuit 30 includes a charge pump circuit 31 and the standby circuit 23. In the drawings, in the charge pump circuit 31, the MOS transistor P11 is connected between the MOS transistors P3 and P4 as a connection switch for connection control to the drain side (node C1P) of the back gate BGP1 of the MOS transistor P1. The drain of the MOS transistor P11 is connected to a source of the MOS transistor P4. Sources and back gates of the MOS transistors P11 and P3 and back gates of the MOS transistors P2 and P4 are commonly connected to the back gate BGP1 of the MOS transistor P1. By this configuration, all N-type wells for the MOS transistors P1, P2, P3, P4 and P11 can be formed as a same N-type well layer. Thereby, it becomes unnecessary to provide a distance between well layers for the N-type wells if they are separately formed. The level converting circuit LS12 converts input low voltage level=voltage GND and an input high level=voltage VCC into the voltage GND and the voltage VDC1, respectively. The gate of the MOS transistor P11 is connected to the output of the level converting circuit LS12. The input of the level converting circuit LS12 is connected to the start signal STA. Through the circuit configuration, the relationship of VCC≦VIN is maintained during the boosting operation period. Especially, in case of VCC=VIN during the boosting operation period, in FIG. 6, the level converting circuits LS11 and LS12 are unnecessary.

Figure 7:
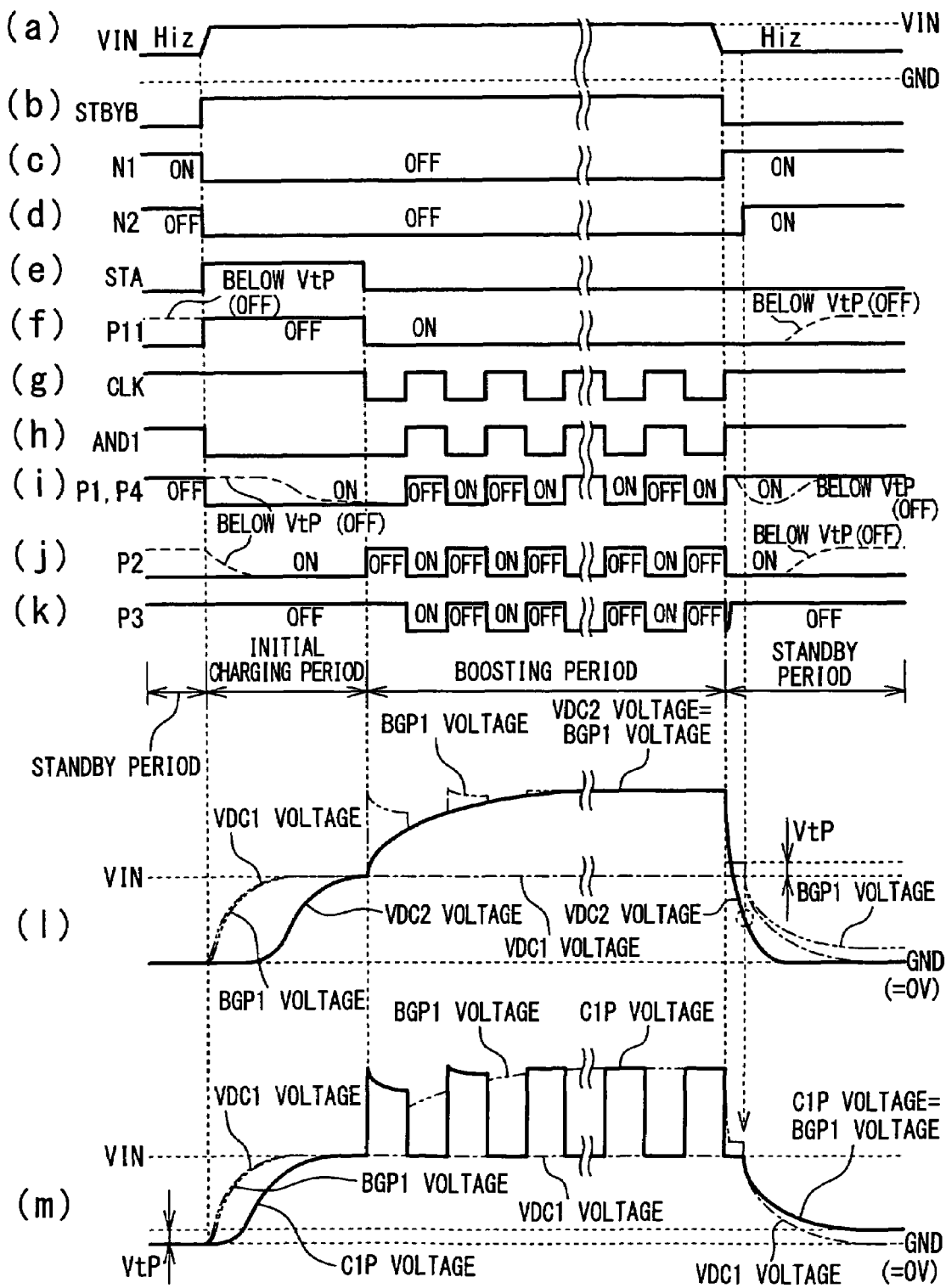
FIG. 7 is a timing chart of the boosting circuit according to the second embodiment of the present invention.

The basic operation of the boosting circuit 30 will be described with reference to FIGS. 6 and 7. First, an operation during the boosting operation period and the standby period will be described. During these periods, since the start signal STA is controlled to be set to the low level, the MOS transistor P11 is turned on. For this reason, the operation is the same as the basic operation of the boosting circuit 20 in the first embodiment during the boosting operation period and the standby period, as apparent from comparison between FIG. 5 and FIG. 7.

Next, the initial charging period will be described. During the initial charging period, the start signal STA supplied to the charge pump circuit 31 is controlled to be set to the high level. Accordingly, the output node of the level converting circuit LS12 is in the voltage VDC1 and the MOS transistor P11 is controlled to be turned off. At this time, since the MOS transistor P3 is also turned off, the back gate BGP1 is electrically separated from the source side (output terminal VDC2) and the drain side (node C1P) of the MOS transistor P1. An input voltage VIN is supplied from the input terminal VDC1 to the back gate BGP1 through the schottky-barrier diode SBD1. Accordingly, the voltage VIN of the voltage supplied to the back gate BGP1 is maintained through the schottky-barrier diode SBD1.

As has been described, the boosting circuit according to the second embodiment of the present invention can achieve a following effect. In the initial charging period during which the input voltage VIN is applied to the boosting capacitor C1 and the smoothing capacitor C2 before start of the boosting operation, the back gate BGP1 common to the MOS transistors P1, P2, P3, P4 and P11 is electrically separated from the source side (output terminal VDC2) and the drain side (node C1P) of the MOS transistor P1. Accordingly, the voltage supplied to the back gate BGP1 through the schottky-barrier diode SBD1 is maintained. For this reason, even when the supply capability of the schottky-barrier diode SBD1 in the present embodiment is smaller than the boosting circuit 20 in the first embodiment, the back gate BGP1 voltage can be increased to about voltage VDC1. Therefore, a size of the schottky-barrier diode SBD1 can be reduced.

Third Embodiment

Figure 8A:
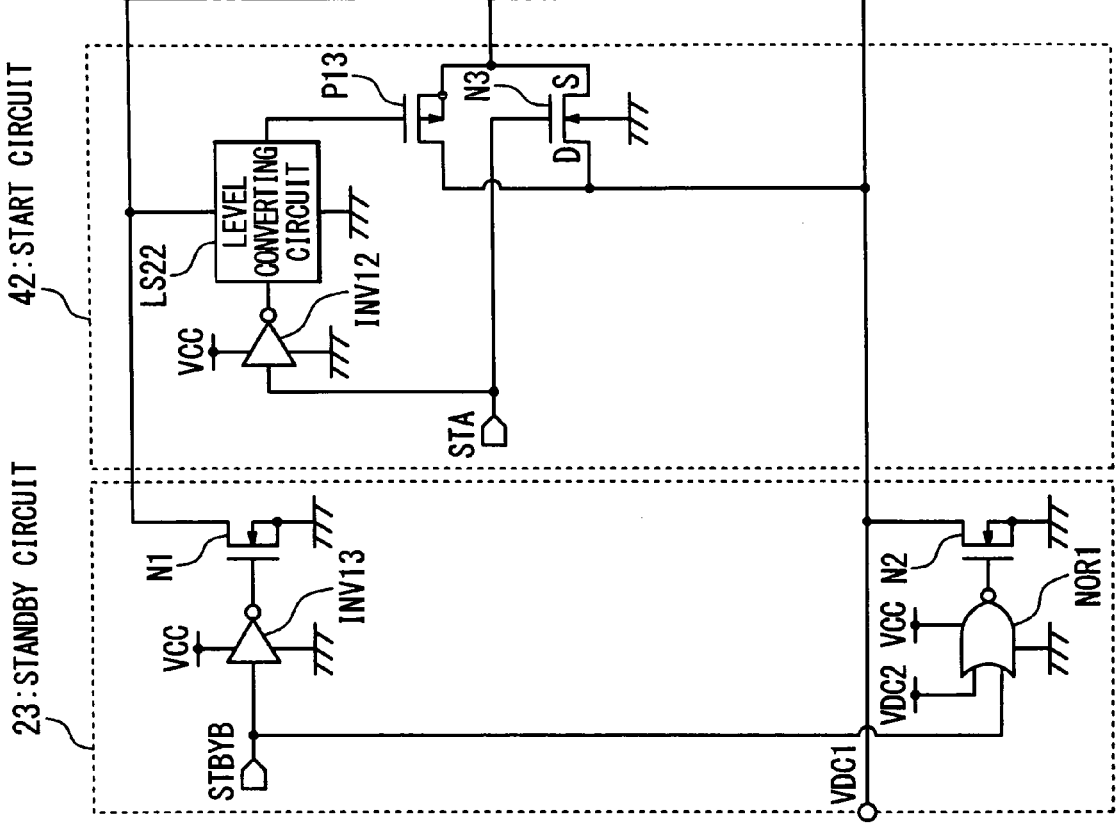
FIG. 8A is a circuit diagram of a boosting circuit according to a third embodiment of the present invention.
Figure 8B:
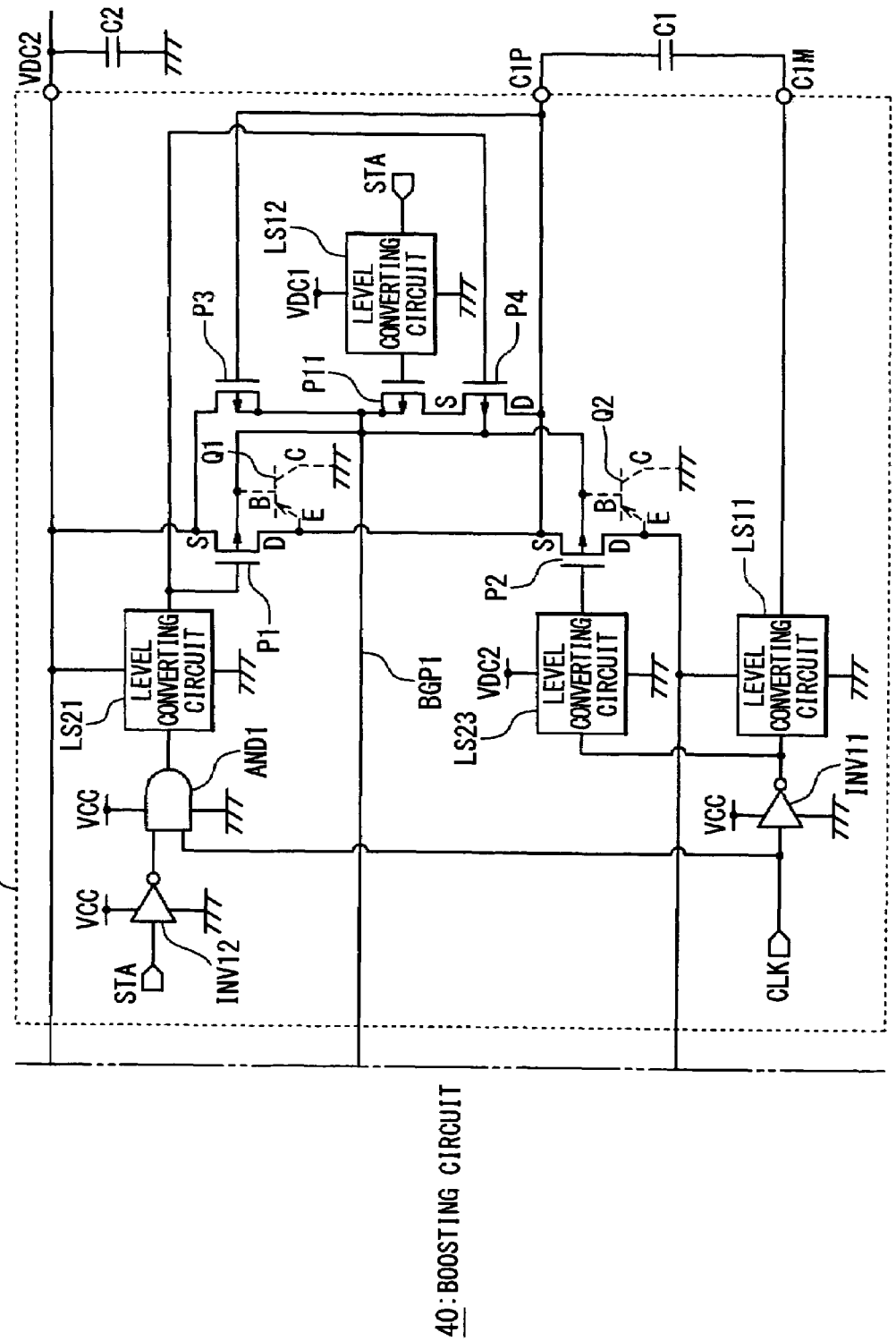
FIG. 8B is a circuit diagram of the boosting circuit according to the third embodiment of the present invention.

Hereinafter, FIGS. 8A and 8B are a circuit diagram showing a configuration of a boosting circuit 40 according to a third embodiment of the present invention. Same reference numerals are assigned to same components as those in FIGS. 1A, 1B, 4 and 6 and description thereof is omitted. The boosting circuit 40 includes a charge pump circuit 41, a start circuit 42 and the standby circuit 23. In FIGS. 8A and 8B, the start circuit 42 includes a P channel MOS transistor P13 and an N channel MOS transistor N3 as components of the supplying circuit. In these figures, a drain of the MOS transistor P13 is connected to a drain of the MOS transistor N3 and a source of the MOS transistor P13 is connected to a source of the MOS transistor N3. That is, the drains and the sources of the MOS transistor P13 and the MOS transistor N3 are connected in parallel. The drains of the MOS transistors P13 and N3 are connected to the input terminal VDC1. The source and the back gate of the MOS transistor P13 and the source of the MOS transistor N3 are connected to the back gate BGP1. The back gate of the MOS transistor N3 is connected to the ground voltage GND. The gate of the MOS transistor P13 is connected to the output of the level converting circuit LS22. The start signal STA is connected to the input of the level converting circuit LS22 through the inverter INV12 and connected to the gate of the MOS transistor N3. By setting the start signal STA into the high level, the MOS transistor P13 and the MOS transistor N3 are turned on.

A basic operation of the boosting circuit 40 will be described with reference to FIGS. 8A, 8B and 9. As shown in FIG. 9, during the boosting operation period and the standby period, the start signal STA is controlled to be set to the low level. At this time, the MOS transistor P11 of the charge pump circuit 41 is turned on, and the MOS transistor P13 and the MOS transistor N3 in the start circuit 42 are turned off. Accordingly, as apparent from comparison among FIGS. 5, 7 and 9, an operation of the boosting circuit 40 in the third embodiment is the same as the basic operation of the boosting circuits 20 and 30 in the first and the second embodiments during the boosting operation period and the standby period.

Next, the initial charging period will be described. As shown in FIG. 9, during the initial charging period, the start signal STA supplied to the start circuit 42 is controlled to be set to the high level. At this time, since the MOS transistor N3 is turned on, the back gate BGP1 voltage is arisen to (voltage VCC−VtN) (VtN is a threshold voltage of the N channel MOS transistor). When the voltage VDC2 is about VtP or less, the level converting function of the level converting circuit LS22 is not normally performed. For this reason, in transition to the initial charging period, the gate voltage of the MOS transistor P13 becomes undefined (voltage lower than [voltage VDC2+VtP]). In start of rising of the voltage VDC1, the MOS transistor P3 is turned off (voltage VDC1<VtP: off, voltage VDC1=about VtP: turned on with high resistance, a period represented by a dotted line in (g) of FIG. 9). When the voltage VDC1 is [P13 gate voltage+VtP] or more, the MOS transistor P13 is turned on and the back gate BGP1 voltage is increased to the voltage VDC1. As described above, during the initial charging period, the MOS transistors N3 and P13 are complementarily turned on. Thus, the back gate BGP1 voltage becomes equal to the voltage VDC1.

As described above, boosting circuit according to the third embodiment of the present invention can achieve following effects. In the initial charging period during which the input voltage VIN is applied to the boosting capacitor C1 and the smoothing capacitor C2 before start of the boosting operation, the MOS transistors N3 and P13 are complementarily turned on. Thus, the input voltage VIN is supplied from the input terminal VDC1 to the back gate BGP1. Accordingly, as a modified example of the first and the second embodiments, a boosting circuit having no schottky-barrier diode SBD1 can be produced. Combination of the MOS transistor N3 with the MOS transistor P13 can perform the same function as the schottky-barrier diode SBD1 in the first and second embodiments.

As described above, according to the present invention, a following effect can be obtained. In transition to the initial charging period during which the input voltage VIN is applied to the boosting capacitor C1 and the smoothing capacitor C2 before start of the boosting operation, the boosting operation period during which charging and discharging of the boosting capacitor C1 is repeatedly performed and the standby period during which the boosting operation stops and the boosting voltage VDC2 is discharged from the boosting capacitor C1 and the smoothing capacitor C2 to the ground voltage GND, it is prevented that the base voltage lowers with respect to the emitter voltage of the parasitic bipolar transistor of each of the charging and discharging P channel MOS transistors. Therefore, degradation of the efficiency due to the latch-up and the reactive current can be prevented.

In the present embodiment, the back gate BGP2 of the MOS transistor P2 of the charge pump circuit 11 in the conventional boosting circuit 10 shown in FIGS. 1A and 1B is commonly connected to the sources and the back gates of the MOS transistors P3 and P4 and the back gate BGP1 of the MOS transistor P1. Since the back gate BGP1 is used as the back gate of the MOS transistor P2, the MOS transistors P5 and P6 forming a switching switch for connection to the source or drain are unnecessary. In addition, since the back gates of the MOS transistors P1 and P2 and the sources and the back gates of the MOS transistors P3 and P4 are commonly connected to the back gate BGP1, it is possible to remove the parasitic bipolar transistor Q2S which contributes to the reactive current and the latch-up from the conventional boosting circuit 10 shown in FIGS. 1A and 1B. In the boosting circuits 20, 30 and 40 in the present embodiment, the parasitic bipolar transistor Q2S is the same parasitic element as the parasitic bipolar transistor Q1. Furthermore, as an additional effect, all N-type wells forming the MOS transistors P1, P2, P3 and P4 can be formed in the same N-type well layer. Thereby, it becomes unnecessary to provide a distance between well layers for the N-type wells if they are separately formed. Furthermore, the MOS transistors P5 and P6 can be omitted in a circuit configuration. Thus, chip area can be reduced.

In the present embodiment, the MOS transistor P7 of the start circuit 12 in the conventional boosting circuit 10 shown in FIGS. 1A and 1B is omitted. In spite of this, as a charging switch of the smoothing capacitor C2 during the initial charging period, both the MOS transistors P1 and P2 are turned on, thereby charging the input voltage VIN to the smoothing capacitor C2. During the initial charging period, to turn on the MOS transistor P1, a circuit is newly added. In the above-mentioned embodiments, the 2-input AND circuit AND1 for inputting the clock signal CLK and an inversion signal of the start signal STA is provided and a circuit for logical control is added. Since the MOS transistor P7 in FIG. 1A can be omitted with this configuration, the parasitic bipolar transistor Q7 which contributes to the reactive current and the latch-up can be advantageously removed from the conventional boosting circuit 10.

In the first and the second embodiments, in the conventional boosting circuit 10 shown in FIGS. 1A and 1B, the schottky-barrier diode SBD1 which is connected to the input terminal VDC1 at its anode and connected to the back gate BGP1 common to the MOS transistors P1, P2, P3 and P4 at its cathode is provided. Thus, when the back gate BGP1 voltage lowers below the voltage VDC1, a voltage is supplied from the input terminal VDC1 through the schottky-barrier diode SBD1. The threshold voltage of the schottky-barrier diode SBD1 (generally, the threshold voltage VfSBD of the schottky-barrier diode (hereinafter referred to as VfSBD) is about 0.1 V) is lower than the threshold voltage $V_{BE}$ (=about 0.7 V) of the parasitic bipolar transistor. Due to effect of this difference in the threshold voltage ($V_{BE}$−VfSBD=about 0.6 V), during the initial charging period, it is possible to prevent the base (back gate BGP1) voltage with respect to the emitter (input terminal VDC1) voltage of the parasitic bipolar transistor Q2D, thereby preventing turn on of Q2D. At this time, it is also possible to prevent the base (back gate BGP1) voltage with respect to the emitter (node C1P) voltage of the parasitic bipolar transistor Q1, thereby preventing turn on of Q1.

In the present embodiments, the gate of the MOS transistor P3 is connected to the node C1P. In the charge pump circuit 11 of the conventional boosting circuit 10 shown in FIGS. 1A and 1B, the gate of the MOS transistor P3 is controlled by the clock signal CLK through the level converting circuits LS21 and INV 21. Since the gate of the MOS transistor P3 is connected to the node C1P, when the voltage of the output terminal VDC2 is lower than (node C1P voltage+VtP voltage), the MOS transistor P3 is turned off. For this reason, at transition from the boosting operation period to the standby period, when electrical charges charged to the smoothing capacitor C2 are discharged to (node C1P voltage+VtP voltage), the output terminal VDC2 is electrically separated from the back gate BGP1. At this time, since the base (back gate BGP1) voltage does not follow lowering of the voltage VDC2 with respect to the emitter (node C1P) voltage of the parasitic bipolar transistor Q1, the parasitic bipolar transistor Q1 is prevented from turning on.

In the present embodiment, at transition from the boosting operation period to the standby period, when electrical charges charged to the boosting capacitor C1 and the smoothing capacitor C2 are discharged to the ground voltage GND, a circuit is newly added so that the MOS transistor N2 may be turned on after the voltage VDC2 becomes lower than the voltage VCC (VCC≦VIN). In the present embodiment, the 2-input NOR circuit in which one input is the output terminal VDC2, the other input is the standby signal STBYB and the output is connected to the gate of the MOS transistor N2 is added. At transition from the boosting operation period to the standby period, since the MOS transistor N2 is turned on after the voltage VDC2 becomes lower than the voltage VCC (VCC≦VIN) (voltage VDC2<threshold voltage of NOR circuit NOR1), the order of voltage lowering of the voltage VDC2 and the voltage VDC1 to the ground voltage GND can be kept constant without depending on a difference between the discharge time of the boosting capacitor C1 and the discharge time of the smoothing capacitor C2. Thus, at transition from the boosting operation period to the standby period, the parasitic bipolar transistor Q1 can be controlled so as not to be turned on. That is in the present embodiment, at transition from the boosting operation period to the standby period, the back gate BGP1 voltage is kept high. During the period of voltage VDC2>[node C1P voltage+VtP], since the MOS transistor P3 is turned on, the back gate BGP1 voltage is equal to the voltage VDC2. In the case of voltage VDC2≦[node C1P voltage+VtP], since the MOS transistor P3 is turned off, the back gate BGP1 voltage is maintained. In the case of voltage VDC2<[node C1P voltage−VtP], following the voltage VDC2, the gate voltage of the MOS transistors P1 and P4 lowers through the level converting circuit LS21. At this time, the MOS transistors P1 and P4 are turned on and the back gate BGP1 is connected to the node C1P. For this reason, the back gate BGP1 voltage becomes equal to the node C1P voltage (=voltage VDC1) through the MOS transistor P4. Even if the MOS transistor N2 is turned on, and the voltage VDC1 and the node C1P voltage start to lower to the ground voltage, since the MOS transistors P2 and P4 are turned on in the case of VDC11 voltage>VtP, the relationship back gate BGP1 voltage=node C1P voltage (=voltage VDC1) holds. In the case of voltage VDC1<VtP, the MOS transistors P2 and P4 are turned off, and the back gate RGP1 voltage and the node C1P voltage are naturally discharged. Accordingly, it is possible to prevent base (back gate BGP1) voltages of the parasitic bipolar transistors Q1 and Q2D from lowering with respect to the emitter (node C1P) voltage of the parasitic bipolar transistor Q1 and the emitter (input terminal VDC1) voltage of the parasitic bipolar transistor Q2D. Thus, the parasitic bipolar transistors Q1 and Q2 are not turned on.

Although the present invention has been described above in connection with several embodiments thereof, it would be apparent to those skilled in the art that those embodiments are provided solely for illustrating the present invention, and should not be relied upon to construe the appended claims in a limiting sense.

What is claimed is:

1. A boosting circuit comprising:
   a boosting capacitor to which an input voltage is applied;
   a smoothing capacitor to which a boosted voltage is applied;
   a discharging MOS transistor configured to connect said boosting capacitor and said smoothing capacitor in a discharging operation during a boosting operation period such that charge stored in said boosting capacitor is discharged to said smoothing capacitor; and
   a charging MOS transistor configured to apply the input voltage to said boosting capacitor in a charging operation during the boosting operation period to charge up said charging capacitor;
   wherein a back gate of said charging MOS transistor and a back gate of said discharging MOS transistor are connected to a common node, and
   said common node is connected to different voltages in the charging operation and the discharging operation.

2. The boosting circuit according to claim 1, further comprising:
   a first connection switch configured to connect said common node to said boosting capacitor in the discharging operation; and
   a second connection switch configured to connect said common node to said smoothing capacitor in the charging operation.

3. The boosting circuit according to claim 1, wherein said charging MOS transistor and said discharging MOS transistor are formed on a same well layer.

4. The boosting circuit according to claim 1, further comprising:
   a supplying circuit configured to supply the input voltage to said common node when a voltage of said common node is lower than the input voltage by a predetermined voltage in the initial charging period.

5. The boosting circuit according to claim 4, wherein said supplying circuit comprises a schottky-barrier diode.

6. The boosting circuit according to claim 4, wherein said supplying circuit comprises:
   a first transistor switch which is turned on immediately when a start signal is supplied in the initial charging period; and
   a second transistor switch which is turned on a predetermined time after a time when said start signal is supplied in said initial charging period,
   wherein said first transistor switch and said second transistor switch are connected in parallel as a parallel circuit, the parallel circuit is supplied with the input voltage and is connected to said common node, and
   when one of said first and second transistor switches is turned on, the input voltage is supplied to the back gate.

7. The boosting circuit according to claim 1, further comprising:

a first logic circuit configured to control said charging MOS transistor to be turned on in an initial charging period prior to the boosting operation period, such that the input voltage is applied to said boosting capacitor; and a second logic circuit configured to control said discharging MOS transistor to be turned on in the initial charging period, such that the input voltage is applied to said smoothing capacitor via said charging MOS transistor.

8. The boosting circuit according to claim 7, further comprising:

a first switch configured to make said smoothing capacitor to discharge in response to a standby signal during a standby period prior to the initial charging period; and a second switch configured to make said boosting capacitor to discharge in response to the standby signal during the standby period.

9. The boosting circuit according to claim 8, further comprising:

a logic circuit configured to control said second switch to be turned off while a voltage of said smoothing capacitor is higher than a predetermined voltage regardless of the standby signal and to be turned on in response to the standby signal when the voltage of said smoothing capacitor becomes equal to or lower than the predetermined voltage.

10. A boosting method comprising:

charging a boosting capacitor with an input voltage through a charging MOS transistor in a charging operation during a boosting operation period to charge up said charging capacitor;

discharging charges stored in said boosting capacitor to a smoothing capacitor through a discharging MOS transistor; and connecting a common node to different voltages in the charging operation and the discharging operation, wherein said common node is connected to a back gate of said charging MOS transistor and a back gate of said discharging MOS transistor.

11. The boosting method according to claim 10, wherein said connecting comprising:

connecting said common node to said boosting capacitor in the discharging operation; and connecting said common node to said smoothing capacitor in the charging operation.

12. The boosting method according to claim 10, wherein said charging MOS transistor and said discharging MOS transistor are formed on a same well layer.

13. The boosting method according to claim 10, further comprising:

supplying the input voltage to said common node when a voltage of said common node is lower than the input voltage by a predetermined voltage in the initial charging period.

14. The boosting method according to claim 13, wherein said supplying comprises supplying the input voltage to said common node through a schottky-barrier diode.

15. The boosting method according to claim 13, wherein said supplying comprises supplying the input voltage to said common node through a transfer gate.

16. The boosting method according to claim 10, further comprising:

charging said boosting capacitor with the input voltage through said charging MOS transistor in an initial charging period prior to the boosting operation period; and charging said smoothing capacitor with the input voltage through said charging MOS transistor said discharging MOS transistor in the initial charging period.

17. The boosting method according to claim 16, further comprising:

making said smoothing capacitor to discharge through a first switch in response to a standby signal during a standby period prior to the initial charging period; and making said boosting capacitor to discharge through a second switch in response to the standby signal during the standby period.

18. The boosting method according to claim 17, further comprising:

controlling said second switch to be turned off while a voltage of said smoothing capacitor is higher than a predetermined voltage regardless of the standby signal and to be turned on in response to the standby signal when the voltage of said smoothing capacitor becomes equal to or lower than the predetermined voltage.

* * * * *